June 23, 1970  H. W. PAIGE ET AL  3,516,622
LONGITUDE KEEPER
Filed Feb. 5, 1968
2 Sheets-Sheet 1
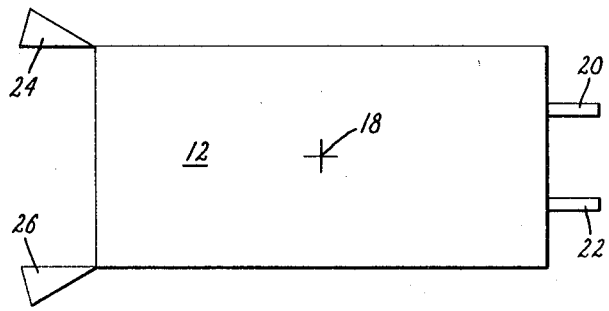
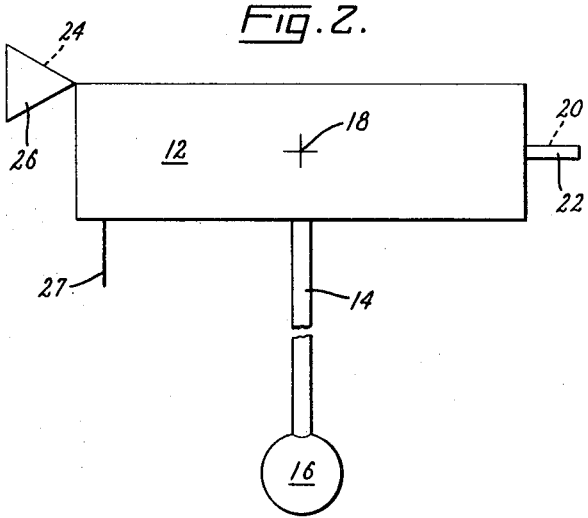
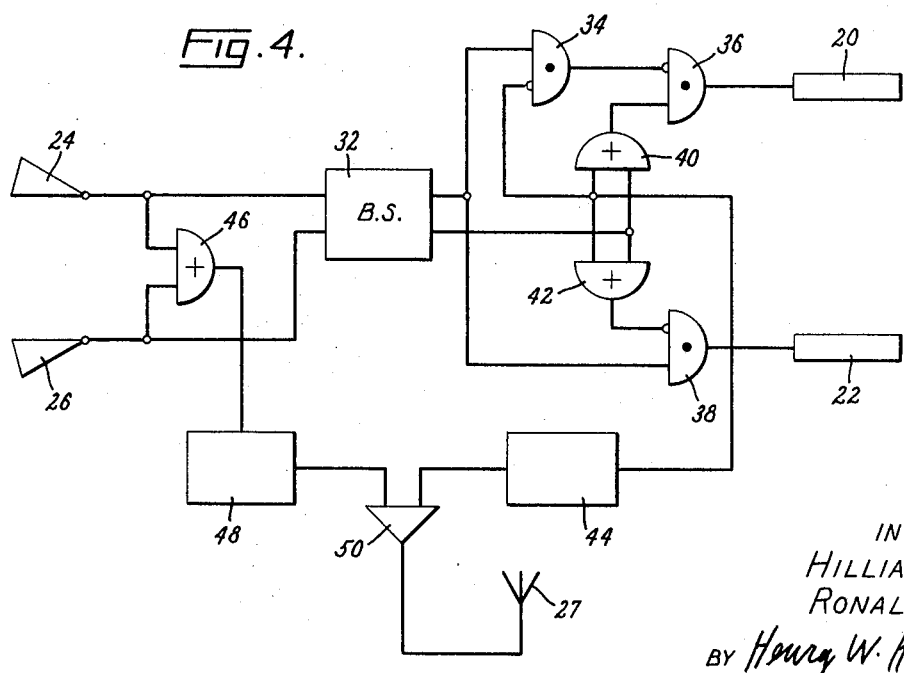
INVENTORS:
HILLIARD W. PAIGE
RONALD G. MOYER,
BY Henry W. Kaufmann
AGENT

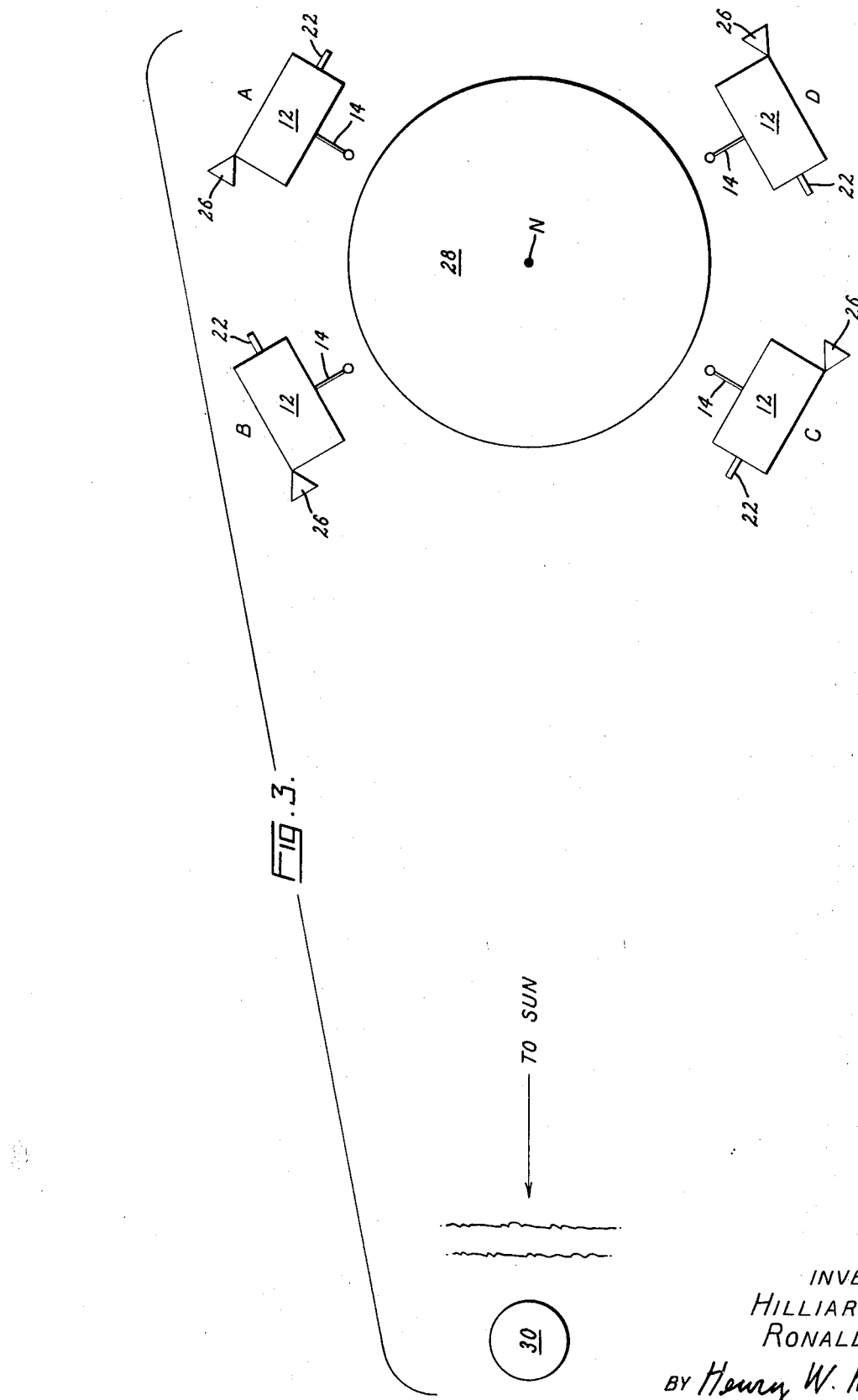

United States Patent Office 3,516,622
Patented June 23, 1970

1

3,516,622
LONGITUDE KEEPER
Hilliard W. Paige, Bryn Mawr, and Ronald G. Moyer, Norristown, Pa., assignors to General Electric Company, a corporation of New York
Filed Feb. 5, 1968, Ser. No. 702,891
Int. Cl. B64g 1/00
U.S. Cl. 244—1                     5 Claims

ABSTRACT OF THE DISCLOSURE

Satellite in synchronous orbit around imperfectly spherical earth will, except at a few special longitudes, require a constant thrust component applied to it along the direction of its motion to maintain it at a fixed longitude. A satellite is stabilized against roll and pitch by a gravity gradient rod carrying a damper, and provided with two controllable thrustors symmetrically located on either side of the center of mass, producing thrust in the yaw plane. Sun sensors sample yaw orientation of satellite with respect to sun, and operate appropriate thrustor to minimize yaw. Operates as "bang-bang" servo system with sampling at least once each orbit.

Citations: Application S.N. 362,216, L. K. Davis, Apr. 24, 1964, now Pat. No. 3,399,317; and U.S. Pat. 3,270,-498, La Rocca.

This invention pertains to the art of space navigation, and more particularly to the art of maintaining at a fixed longitude with respect to an imperfectly spherical parent body a satellite in synchronous orbit in its equatorial plane.

For various purposes, it is useful to place a satellite in orbit at such a distance from the parent body that the satellite's orbital period is equal to the period of rotation of the parent body (e.g. the earth) on its axis. If such satellite's orbit lies in the equatorial plane of the parent body, and if the parent body is of such mass distribution that its gravitational field is identical with that of a point mass, then a synchronous satellite (i.e., a satellite in synchronous orbit) will remain at a fixed ground position as seen from the parent body, i.e. at zero latitude and constant longitude. One common example of the utility of a satellite in such fixed ground position is that it may carry equipment for relaying, between two ground stations which are out of sight of each other, but in sight of the satellite, communications transmitted by some radiation propagated in straight lines. Unfortunately for the use of earth satellites in synchronous orbits, the earth's mass is distributed so that its gravity field in the equatorial plane corresponds to that of an ellipsoid. Passive synchronous satellites of earth can, in consequence, be stable only at certain longitudes corresponding to the ends of semi-axes of an ellipse. At any other longitude, a satellite at synchronous range will require the continuous application of a thrust component parallel to the velocity of the satellite to maintain it at its station in longitude.

It is comparatively easy to maintain a satellite correctly oriented with respect to the local vertical by the use of a long member extending either above or below the satellite so that the gradient of the gravitational field tends to align the rod with itself. It is expedient, in such case, to provide the rod at its distal end with a motion damper of the kind described in copending application S.N. 362,-216, now Pat. No. 3,399,317, entitled "Motion Damper" by L. K. Davis filed Apr. 24, 1964, which application is assigned to the assignee of the present application, and to which reference is made for further description. The effect of the use of the gravity gradient rod with a damper

2 is to stabilize the satellite in such a way that it neither rolls nor pitches appreciably. There is only damping restraint, however, upon its yawing which does not restrict slow permanent deviation. This is most unfortunate for the application of a properly oriented continuing thrust to the satellite, since it would be possible to maintain a synchronous satellite at its longitude station by simply affixing to it a continuously operating thrustor providing thrust of proper magnitude in the yaw plane (i.e. the plane containing the roll and pitch axis) if one could be sure that the vehicle would not yaw. Absent such assurance, however, one requires two elements in combination; first, some yaw reference; second, thrust or torque means controllable to maintain the vehicle's thrustors pointing in the required direction. We have invented means to accomplish this with minimal equipment and consequent maximal reliability, by controlling the vehicle's thrustors to constitute torque means as required, employing as a reference the direction of the sun with respect to the vehicle during the restricted parts of the synchronous orbit in which the sun direction gives adequate azimuth information.

Thus we achieve the basic objective of maintaining a synchronous earth satellite at a fixed longitude station at which it would not passively be stable by means which are simple and consequently economical and reliable.

For the better understanding of our invention we have provided figures of drawing in which:

FIG. 1 represents schematically a top view, and FIG. 2 represents a side view, of a satellite embodying our invention;

FIG. 3 represents a satellite according to FIGS. 1 and 2 in various positions around the earth; and FIG. 4 represents the control system of the embodiment of FIGS. 1 and 2.

Referring to FIGS. 1 and 2, there is represented a satellite body 12 provided with an extended rod 14 whose function is to stabilize the satellite against pitch and roll through its tendency to align itself with the gradient of gravity. At the end of the rod 14 there is represented a damper 16, which may conveniently be of the type described in copending application Ser. No. 362,216, now Pat. No. 3,399,317, entitled "Motion Damper," filed Apr. 24, 1964 by L. K. Davis, and assigned to the assignee of the present application. The center of mass of the satellite is represented by a cross 18. Two thrustors, which may conveniently be of the kind described in U.S. Pat. 3,270,498 by La Rocca, are mounted fixedly on the satellite, as indicated by representations 20 and 22. These thrustors are located symmetrically on lines on opposite sides of the center of mass 18, and are so adjusted that the operation of either thrustor alone provides sufficient thrust to maintain the satellite at its desired longitude, the thrustors being so oriented that each produces thrust in the same direction, in a plane approximately at right angles to the axis of rod 14, which plane may conveniently be identified with the yaw plane. Clearly, since the thrustors 20 and 22 are both located out of line with the center of mass, operation of one thrustor alone, while producing the proper total thrust to keep the satellite at its station, will tend to rotate it about its yaw axis. This does indeed occur; but damper 16 is designed to provide sufficient damping so that continued operation of one thrustor for one whole orbital period will rotate the satellite only by a small amount—e.g. ten degrees.

Two sun sensors 24 and 26 are located so that their field of view lies generally in the direction of thrust of the thrustors 20 and 22. However, while both can "see" dead ahead, their fields of view in azimuth otherwise do not overlap. That is, if the sun is dead ahead both sensors will be illuminated, but if it lies in any other azimuth nearly but not exactly ahead, only one sensor will be illuminated. The approximately fields of view are indicated by the shape of the quasiconical or trapezoidal symbols used to represent them.

Item 27 symbolizes an antenna whose use will appear hereinafter.

In FIG. 3 there are represented various possible positions of the satellite represented in FIGS. 1 and 2 in an orbit around a parent body or earth 28, the whole illuminated by a sun 30. The earth 28 is represented so that its north pole (represented by the letter "N") is visible. It will be seen that the sun sensors do not view the sun except during the passage from position A to position B. Bearing in mind that the satellite is in an equatorial orbit around the earth, it may be seen that any yaw of the satellite from its equatorial heading will produce selective illumination of only one of the sensors 24 and 26.

FIG. 4 represents schematically the connection of sun sensors 24 and 26 to control the operation of thrustors 20 and 22. Sensors 24 and 26 are connected to the two inputs of a bistable device 32, which may be a conventional bistable circuit employing transistors or similar devices. The output from bistable device 32 which is produced by an input from sensor 24 is connected through an inhibitable gate 34 to the inhibiting connection of gate 36, and also to the input of inhibitable gate 38. Thus, as the diagram of FIG. 4 indicates, if gate 34 is not inhibited, a signal from 32 (upper terminal) will inhibit gate 36, cutting off thrustor 20, and pass through gate 38 (if uninhibited) operating thrustor 22. If an output from sensor 26 causes a signal to be emitted from the lower terminal of 32, that will pass through buffer 40 through gate 36 (if uninhibited) to operate thrustor 20, and through buffer 42 to inhibit gate 38, cutting off thrustor 22. Thus, in the absence of any output from receiver 44, an input from sensor 24, and no input from 26, will cause bistable device 32 to command thrustor 22 to operate; and an input from sensor 26, absent an input from 24, will cause thrustor 20 to operate. It may be seen from inspection of FIG. 1 that this logic is correct to cause the satellite to be rotated in such a direction as to tend to bring the source of illumination dead ahead, causing both sensors 24 and 26 to be illuminated. When this condition is reached, it does not matter which of the two thrustors 20 and 22 is operated, since continued operation of either will cause the satellite to yaw enough to terminate the illumination of one of the sensors, and effect a switching of bistable device 32 which will cause the other thrustor to operate. This point is detailed since it signifies that it does not matter whether two simultaneous inputs to the device 32 cause it to switch, or simply to remain in its prior condition.

It will be apparent from the foregoing that, like all "bang bang" systems, the present one does not cause the controlled device to stop at or near equilibrium, but rather to oscillate at permissibly small amplitude around the equilibrium point. Since the satellite moves from position B through C and D back to position A without any further actuation of device 32, the combined effect of its moment of inertia, the damping provided by 16 (and any other damping devices or phenomena), and the torque provided by the off-center thrust of thrustor 20 or 22, must be such that it will not yaw by more than a permissible angle during the transit from B to A.

It has been implicitly assumed that, when the satellite is placed in orbit, it is oriented so that the thrustors thrust not only parallel to its desired orbit path, but in the proper direction. It is possible for the satellite to be stabilized half a circle of yaw rotation away from its desired orientation, in which case the thrust will be in a direction opposite from the desired one. This may be remedied by control signals provided from the ground via receiver 44. Output signals from 44 will pass through buffer 40 to pass through gate 36 to operate thrustor 20. The same signal from receiver 44 will operate to inhibit gate 34, so that an output from the upper output terminal of bistable device 32 cannot pass through inhibit gate 34 to inhibit gate 36. Thus a signal from receiver 44 will always turn off thrustor 22 and operate thrustor 20, regardless of the state of bistable device 32. In order to determine the approximate orientation of the satellite, the outputs of sensors 24 and 26 are buffered together through buffer 46 and fed as control or modulation to transmitter 48, which is matched, together with receiver 44, to antenna 27 by hybrid 50. The orbital position of the satellite may be determined by conventional means, and the illumination or darkness of sensors 24 and 26 may be telemetered to the ground by transmitter 48. If, in early morning, the signal (or the absence of signal) from transmitter 48 indicates that neither of sensors 24 and 26 is illuminated, a command signal from ground to receiver 44 will cause it to operate to cause thrustor 20 to operate continuously, inhibiting by inhibit gate 38 any input from sensor 26. This will cause the satellite, in the course of a number of orbits, to rotate through a full half circle in yaw. This may be determined by interrupting the ground-originated signal to receiver 44 in early morning and monitoring the signal from transmitter 48 to determine whether one of sensors 24 and 26 is providing an output. When such an indication is received, the control signal from the ground to receiver 44 may be stopped, and the device may be left to orient itself automatically, as has been described. It is also possible, for locating the satellite initially at the desired longitude, to provide a more elaborate control system which can be used to override the control of device 32 and cause both thrustors 20 and 22 to operate simultaneously, providing more thrust than is required for mere station keeping, in order to force the satellite to the desired longitude. However, satellites are usually provided with various devices for locating them initially in the proper orbit and station, and the use of such conventional devices may be preferred. Since such devices are ordinarily required to function only intermittently during the initial placing in orbit, they may be designed without the provisions for very long life and minimal consumption of working thrust substance of which our invention is capable. They thus do not replace our invention, but are merely useful auxiliaries to it.

We claim:

1. Station-keeping means for a space vehicle
   having a center of mass and
   adapted to move in orbit as a satellite of a parent body which
      is a planet of a sun,
      has a shadow, and
      around which a gravitational field of gravity exists which has a gradient,
comprising:
   means to orient the vehicle with respect to the local gradient of the gravitational field;
   first independently controllable thrust means to provide to the vehicle a thrust component
      in a yaw plane normal to the local gradient of gravity on a line passing on a first side of the center of mass;
   second independently controllable thrust means to provide to the vehicle a thrust component
      in the said yaw plane on a line passing on a second side of the center of mass;
   sensor means to sense radiation from the sun and to produce sensor signals representative of the orientation of the said thrust components with respect to a line from the vehicle center of mass to the sun;
   control means to receive the said sensor signals and responsively thereto to apply to the said thrust means
      control signals to cause that and only that thrust means to operate which will tend to rotate the vehicle to make coplanar the line along which the said thrust is produced with the line from the vehicle center of mass to the sun;

damping means to damp the rotation of the vehicle resulting from the operation of the said thrust means sufficiently to reduce the said rotation to much less than a full circle during its movement through one orbit.

2. A device as claimed in claim 1 further comprising transmission means to transmit from the vehicle signals representative of the sensor signals.

3. A device as claimed in claim 1 further comprising receiver means to receive overriding signals to control operation of the therein said thrust means.

4. A device as claimed in claim 1 in which the therein said means to orient the vehicle with respect to the local gradient is a passive distribution of mass.

5. A device as claimed in claim 1 in which the therein said sensor means senses radiation from the sun only in the early part of the satellite's orbit subsequent to its entrance into the shadow of its parent body.

References Cited

UNITED STATES PATENTS 3,302,905 2/1967 Davis et al.
3,367,605 2/1968 Wanger.
3,429,526 2/1969 Genty.

OTHER REFERENCES

J. S. Pistiner: On-Off Control System for Attitude Stabilization of a Space Vehicle, American Rocket Society Journal, April 1959, pp. 283–284.

MILTON BUCHLER, Primary Examiner

J. L. FORMAN, Assistant Examiner